United States Patent [19]
Raynham

[11] Patent Number: 5,127,014
[45] Date of Patent: Jun. 30, 1992

[54] DRAM ON-CHIP ERROR CORRECTION/DETECTION

[75] Inventor: Michael Raynham, Los Gatos, Calif.

[73] Assignee: Hewlett-Packard Company, Palo Alto, Calif.

[21] Appl. No.: 479,781

[22] Filed: Feb. 13, 1990

[51] Int. Cl.⁵ .................. G06F 11/10; G11C 29/00
[52] U.S. Cl. ........................ 371/37.3; 365/200; 365/238.5; 371/40.1; 371/40.2
[58] Field of Search ............ 371/37.3, 40.1, 40.2; 365/200, 222, 238.5

[56] References Cited

U.S. PATENT DOCUMENTS

| | | | |
|---|---|---|---|
| 4,380,812 | 4/1983 | Ziegler, II et al. | 371/37.3 |
| 4,694,454 | 9/1987 | Matsuura | 371/37.3 |
| 4,758,992 | 7/1988 | Taguchi | 365/222 |
| 4,903,268 | 2/1990 | Hidaka et al. | 371/40.1 |
| 4,945,517 | 7/1990 | Miyatake et al. | 365/238.5 |

Primary Examiner—Charles E. Atkinson
Attorney, Agent, or Firm—Roland I. Griffin; Alan H. Haggard

[57] ABSTRACT

Error detection or correction is provided on the same chip as DRAM memory. Because data and error correction bits need not travel on an external bus, error detection/correction can be conducted on a larger number of bits than the width of the data bus. When using memories which provide for access to a row of memory, such as static-column or fast-page mode memories, error correction is conducted on an entire row of memory during one error correction cycle. Following operations of the correction cycle, the data within a row of memory can be accessed independently of the EC circuitry.

19 Claims, 6 Drawing Sheets

DRAM ON-CHIP ERROR CORRECTION/DETECTION

BACKGROUND OF THE INVENTION

The present invention relates to a method and apparatus for detecting and correcting errors in computer memory and, in particular, to on-chip error detection/correction in dynamic random access memory (DRAM) on a multi-word or page basis.

Bits stored in a computer memory are susceptible to the occurrence of errors, i.e., changes in the value of bits stored in memory. Such errors can be "hard" (i.e., permanent) hardware errors or "soft" (i.e., non-permanent) errors. Soft errors are often the result of radiation, such as cosmic radiation or radiation from decay of radioactive material. Soft errors occur in memory at random locations and times, although at an average rate which can be empirically determined.

A common scheme for detecting and correcting errors in memory involves storing, in addition to the desired data bits, one or more error correction ("EC") bits in association with the stored data bits. A number of algorithms are available for generating EC bits which permit the detection or correction of errors in the stored data bits. For example, Frederick F. Sellers, et al., *Error Detecting Logic For Digital Computers*, McGraw-Hill Book Co., describes common circuitry used in error detection. Error correction or detection can be performed at a number of levels. For example, an EC scheme can be devised to detect or correct, at most, a one-bit error in each EC cycle using a given number of stored error correction bits. In order to detect or correct two or more errors per EC cycle, a larger number of EC bits needs to be stored.

A typical error correction scheme is described in U.S. Pat. No. 4,719,627, issued Jan. 12, 1988, to Peterson, et al. In this scheme, following a row address strobe (RAS) and column address strobe (CAS), a 118-bit word and a corresponding 17-bit error correction code are transmitted over a bus to an off-chip error detection/correction device. This process is repeated for each read/write cycle.

Any error correction scheme requires a finite time for completion, which thus represents a cost of error correction. The time required for error correction is related to the number of error correction bits and the number of data bits being processed during any one error correction cycle. In general, greater efficiency is achieved by processing a larger number of bits in each EC cycle. In previous devices, the overhead cost of error correction was relatively high because the number of data bits and error correction bits processed in a single cycle was limited by at least two factors. First, the memory access mode used determines the number of data bits and error correction bits which can be accessed during a single cycle, i.e., a single assertion of required memory access signals, such as a row address strobe (RAS) and a column address strobe (CAS). Second, because prior devices required transmission of the data and error bits over a bus, the bandwidth of the bus limited the number of bits which could be transmitted for processing during any one EC cycle.

In addition to the time cost of EC processes, there is a storage cost, since memory which is used to store EC bits is unavailable for data storage. For any level of correction (i.e., one-bit error correction, two-bit error correction, etc.), the number of stored EC bits required is approximately a decreasing exponential function of the number of data bits being error-checked. For this reason, as the number of data bits checked in each EC cycle increases, the ratio of EC bits to data bits (and thus the ratio of unusable to usable memory locations) decreases. However, since, in previous devices the number of bits processed in a cycle was limited (as discussed above), the storage cost or ratio of unusable EC bits to usable data bits was relatively high.

Error correction schemes are able to correct no more than a predetermined number of bits per EC cycle. Thus, it is desirable to perform error correction with sufficient frequency that accumulation of more than the predetermined number of errors between correction cycles will be unlikely. To accomplish this goal, many memory systems include a periodic "scrubbing" cycle in which all memory locations are error-corrected. Such "scrubbing" is typically conducted in addition to any error correction which may be performed during normal read/write access. During the scrub cycle, the memory is unavailable for other use, and thus scrubbing represents an overhead cost of error correction. One approach to reducing such overhead is described in U.S. Pat. No. 4,682,328, issued Jul. 21, 1987, to Ramsay, et al. In this approach, parity checking and data recovery are performed during DRAM refresh. However, the efficiency of such parity checking is limited by the number of data bits which can be parity checked in each parity-checking cycle.

U.S. Pat. No. 4,335,459 issued Jun. 15, 1982, to Miller discloses providing error correction circuitry on the memory chip to increase yield and reliability and decrease cost and power consumption. This patent, as most previously described devices relate to memories in which each memory access provides data having a bit width equal to the word size. Several modern memory devices, however, permit access in one or more of several multi-word modes, i.e. a mode permitting access to more than one addressable unit without separately asserting and deasserting RAS and CAS for each addressable unit. In typical memories, each word of memory is an addressable unit. In such systems, multi-word modes would permit access to more than one word without asserting (and deasserting) RAS and CAS for each word which is accessed. Examples of multi-word mode memories include fast page mode memories and static column mode memories. Multi-word mode memories permit accessing, during any one memory cycle, a number of bits greater than the bit width of the data bus. Typically, such modes permit accessing all data in an entire row of the memory.

SUMMARY OF THE INVENTION

The present invention includes providing for error detection and/or correction circuitry formed on the memory chip itself. By providing the circuitry on the memory chip, error detection/correction can be conducted on a number of bits which is greater than the bit-width of the data bus. The present invention provides benefits beyond those associated with placement of multiple components on a single chip, such as miniaturization. By eliminating the need for transmission of error correction data over a data bus, a new mode of error correction/detection becomes available. According to the present invention, error correction can be conducted on an entire row of static-column or fast-page mode dynamic random access memory (DRAM), especially read/write memory, during a single detection/correction cycle.

Full advantage can be taken of the increase in efficiency which follows from performing detection/correction on a larger amount of data per correction cycle. The scrub cycle can be incorporated as part of the refresh cycle, thus eliminating overhead normally associated with the scrub cycle. Because hard errors can be corrected with relatively little overhead cost, it becomes feasible to use memory chips which have one or more hard errors. This aspect becomes very important in large memory devices such as 16 megabit (Mbit), 64 Mbit, 256 Mbit and 1 gigabit DRAM devices.

Certain problems of previous devices have been recognized by the present invention. It has been recognized that previous error correction circuitry did not take advantage of increased efficiency and other benefits which have been found to be possible according to the present invention, using multi-word access mode memories such as fast page mode or static column mode memories.

It has also been recognized that the requirement for transmitting error correction data over a bus represents a bottleneck in the error correction and detection process. Furthermore, in previous devices, memory access time is adversely affected by the time required to conduct error detection/correction.

DETAILED DESCRIPTION OF THE PREFERRED EMBODIMENTS

Figure 1:
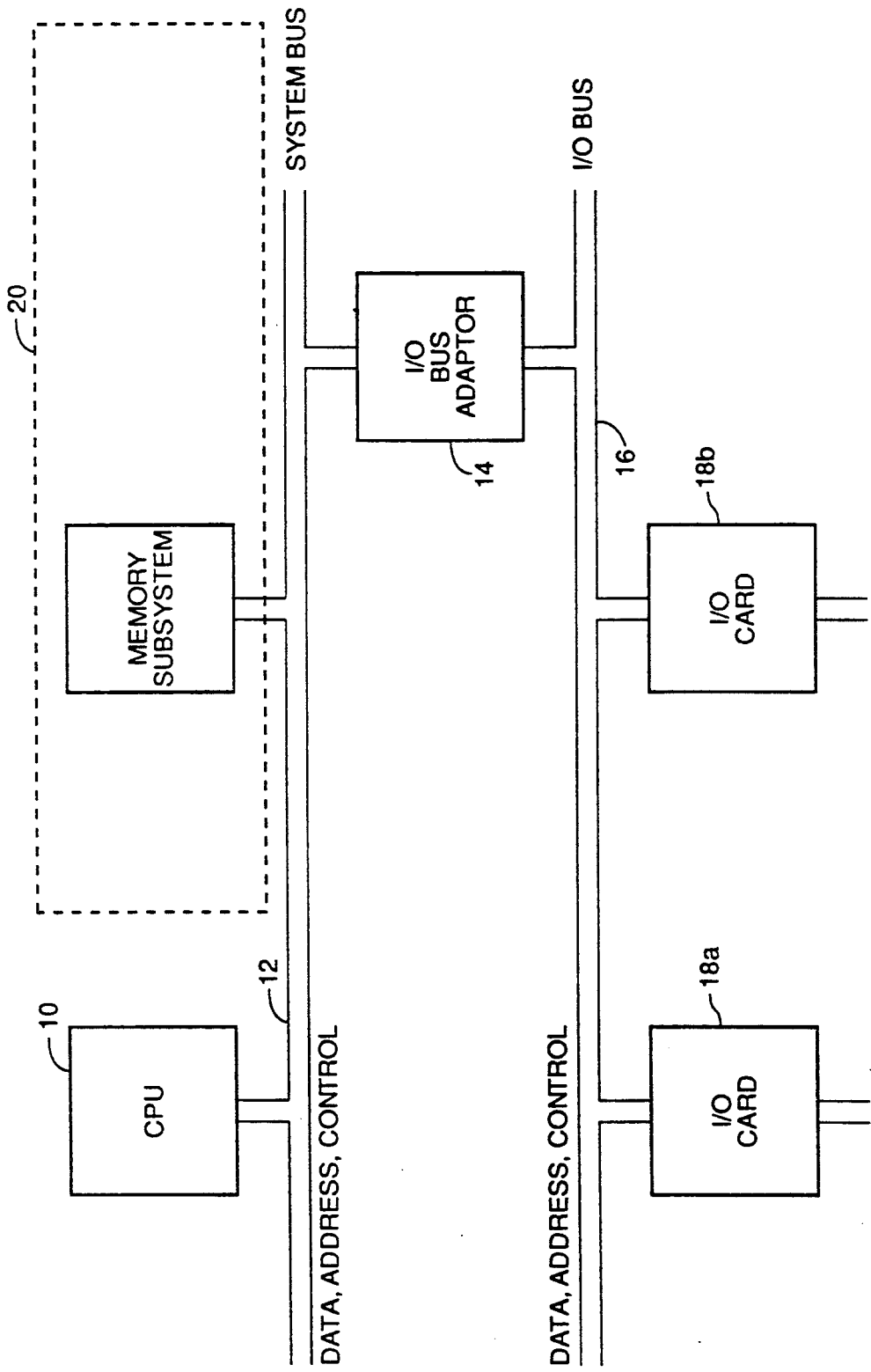
FIG. 1 is a block diagram of a computer system.
Figure 2:
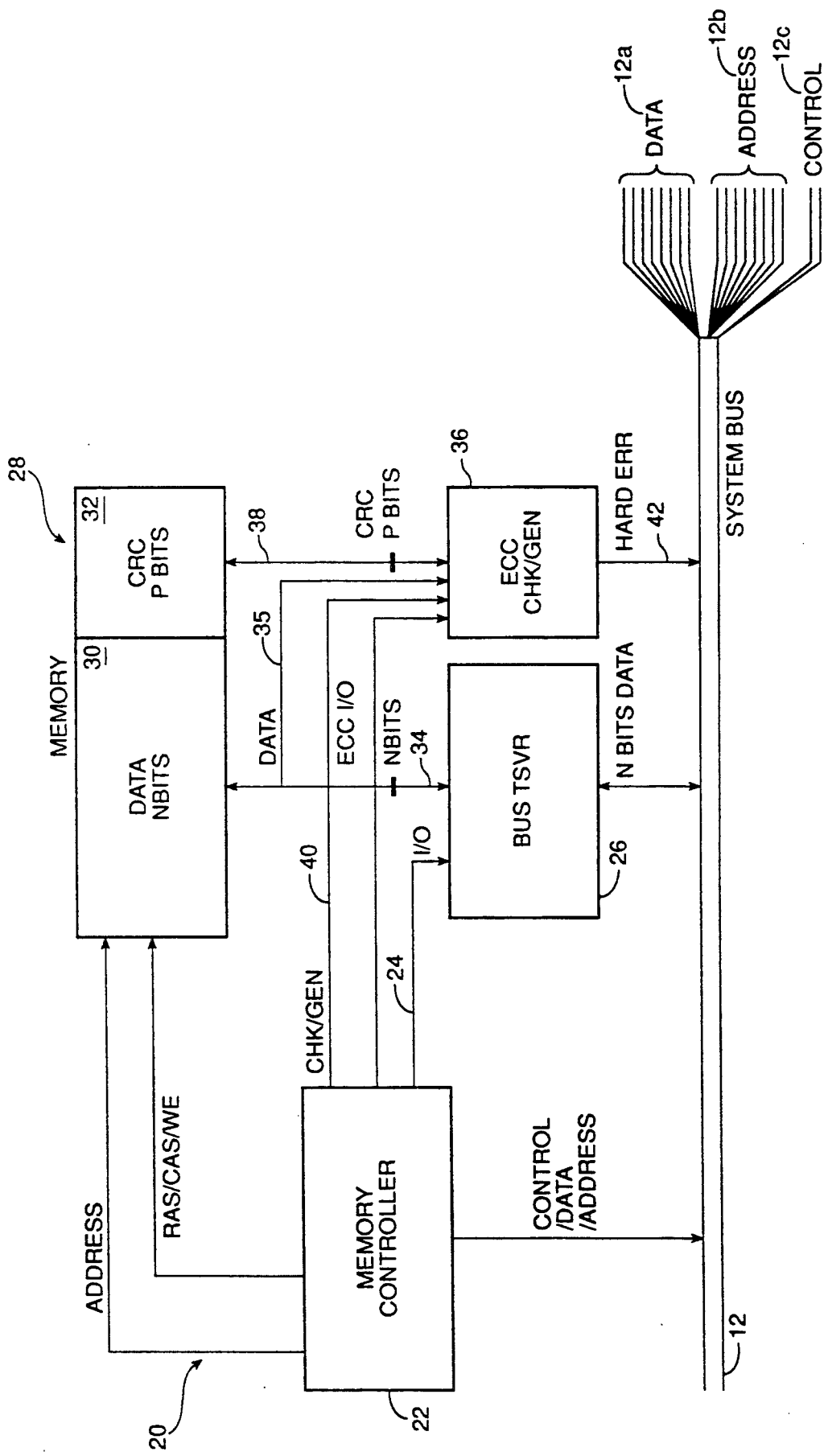
FIG. 2 is a block diagram of the relationship of error checking circuitry to other memory subsystem components in previous devices.

FIG. 1 depicts a computer system which includes a central processing unit (CPU) 10. The CPU communicates with other components by transmitting data, address, and control signals over a high-speed system bus 12. An I/0 bus adapter 14 connects the system bus 12 to an I/0 bus 16. The I/0 bus 16 is used to provide data, address, and control signals to one or more I/O cards 18a, 18b, such as a disk controller or a graphics monitor card. A memory subsystem 20 communicates with the CPU 10 over the system bus 12. As shown in FIG. 2, the memory subsystem 20 includes a memory controller 22 which receives control, data, and address signals from the system bus 12. The system bus 12 typically includes a data bus 12a, an address bus 12b, and a control bus 12c. The buses 12a, 12b, and 12c can be of various bandwidths, with the bandwidths of the data bus 12a being most important for present considerations. Typically, the buswidth of the data bus 12a is such that a number of bits equal to the bit-width of one word in the system is transmitted over the data bus 12a in one or two bus cycles. The memory controller 22 provides signals over an I/0 line 24 to a bus transceiver 26. The bus transceiver transmits and receives data to and from the system bus 12 in a group of N-bits, where N is the buswidth of the data bus portion of the system bus 12.

The memory controller 22 also provides address information and control signals, such as row address strobe (RAS), column address strobe (CAS), and write-enable (WE), to the memory 28. The memory 28 is used to store M words, each word including N bits of data in a first area 30 and P error correction (CRC) bits for each of the M words in a second area 32. A data line or secondary data bus 34 is used to transmit data in a group of N bits between the data portion of the memory 30 and the bus transceiver 26.

An error correction code (ECC) checking/generating circuit 36 receives data bits and corresponding CRC bits over signal lines 35, 38, respectively. Typically, data line 35 is an extension of the secondary data bus 34, having a buswidth equal to the data buswidth, i.e., a bus which is N-bits wide. Typically, signal line 38 is a bus having a buswidth equal to the number of CRC bits 32, i.e., a bus which is P-bits wide. The memory controller 22 provides the error correction code (ECC) circuit 36 with an errorchecking/generating enablement signal over a signal line 40. The ECC circuit 36 outputs a signal over a signal line 42 to the system bus 12 to indicate the occurrence of a hard or non-correctable error. The ECC circuit 36 also outputs generated CRC bits over the signal line 38 and, in some cases, provides corrected data over the secondary data bus 34 for storage in the memory 28.

The values of N and P for a particular memory subsystem will vary. In a typical system, N is 64 and P is 8. Such a system will enable the ECC device to detect two errors and correct one error out of 72 bits (i.e., the 64 data bits and the 8 EC bits). As discussed above, U.S. Pat. No. 4,719,627 discloses performing correction on a 118-bit word, using a 17-bit error correction code.

In operation, the memory controller 22 receives a control signal indicating that data is to be read from or written to the DRAM 28. In response, the memory controller 22 provides addresses and control signals to the memory 28. The data being read to or from the memory 28 is simultaneously provided to the ECC circuit 36. In response to the checking/generating control signal 40, the ECC will check P CRC bits 32 corresponding to data which has been read, or will generate P CRC bits corresponding to data which is being written.

During a read operation, the ECC circuit 36 will check the corresponding CRC bits 32 to determine if an error is indicated. If there is an error, the ECC circuit 36 will correct the error where possible, and provide the corrected data to the bus 34 for storage in the memory 28 and for transmittal by the bus transceiver 26 to the system bus 12. When error correction is not possible, the ECC circuit 36 will provide a signal indicating a hard error over data line 42 to the system bus 12. During a write operation, the ECC circuit 36 will generate P CRC bits corresponding to the data bits being written, according to a predetermined ECC code. The generated bits will be sent over signal line 38 for storage in the CRC portion 32 of the memory 28.

If another word is to be read from or written to the memory 28, the ECC process is repeated for each word, even though subsequent words may be in a contiguous position, such as in the same row. As can be seen from FIG. 2, the amount of data which can be sent to the ECC circuitry 36 during any one ECC cycle is limited by the bandwidth of the bus 35, which provides such data to the ECC circuit 36.

Figure 3:
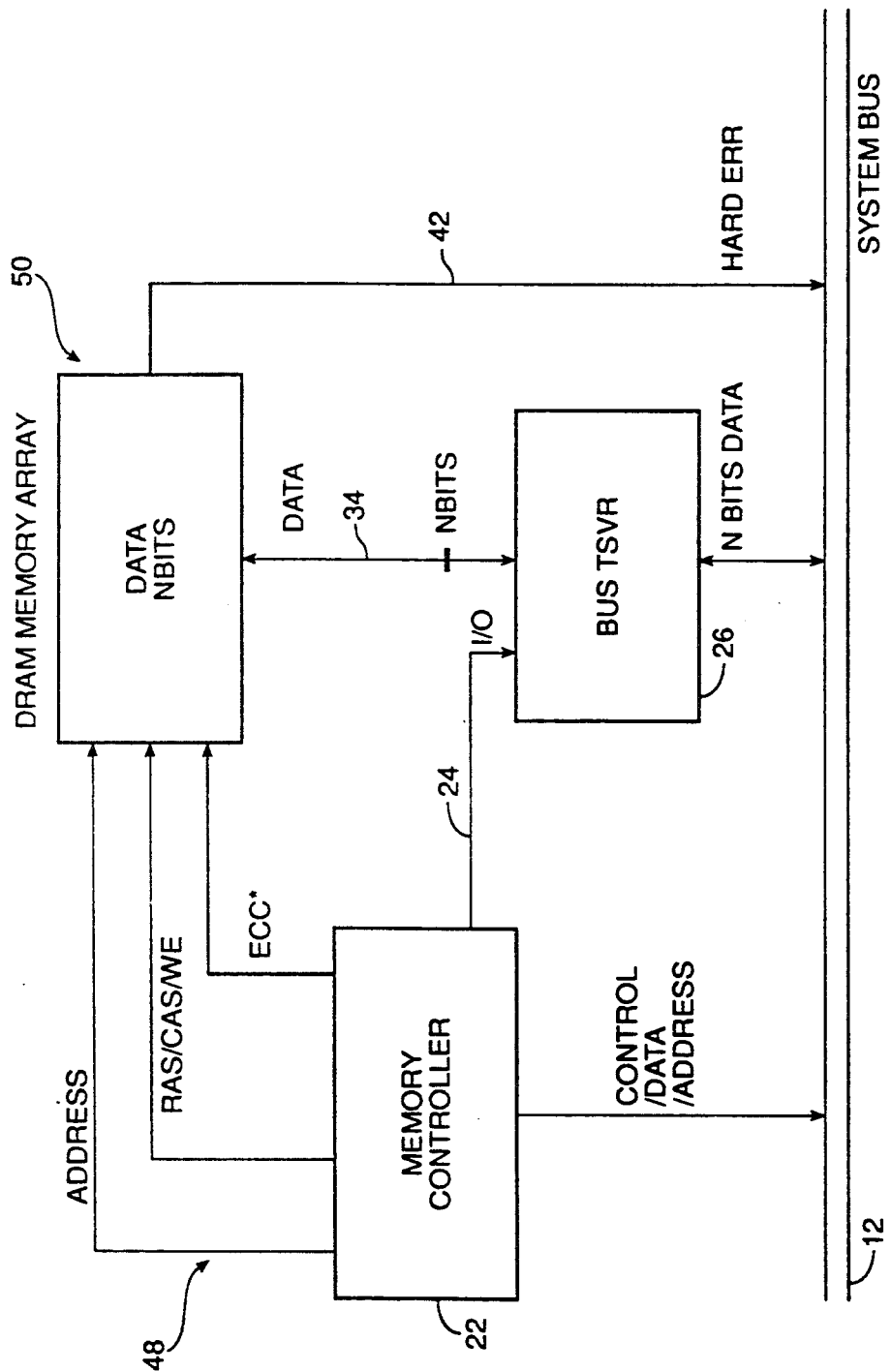
FIG. 3 is a block diagram showing the relationship of memory subsytem components according to the present invention.

FIG. 3 depicts a memory subsystem 48, according to the present invention. The memory controller 22 and bus transceiver 26 are similar to those depicted in FIG. 2. In the system depicted in FIG. 3, however, the ECC checking and generating circuit is formed on the same chips 50 as the DRAM memory array. Accordingly, there is no need for buses 35, 38 (FIG. 2) for sending data and CRC bits from the memory to the ECC circuit. The DRAM chip array 40 outputs a hard error signal over a signal line 42 to the system bus 12. A data line 34 carries data between the DRAM chip 50 and the bus transceiver 26.

Figure 4:
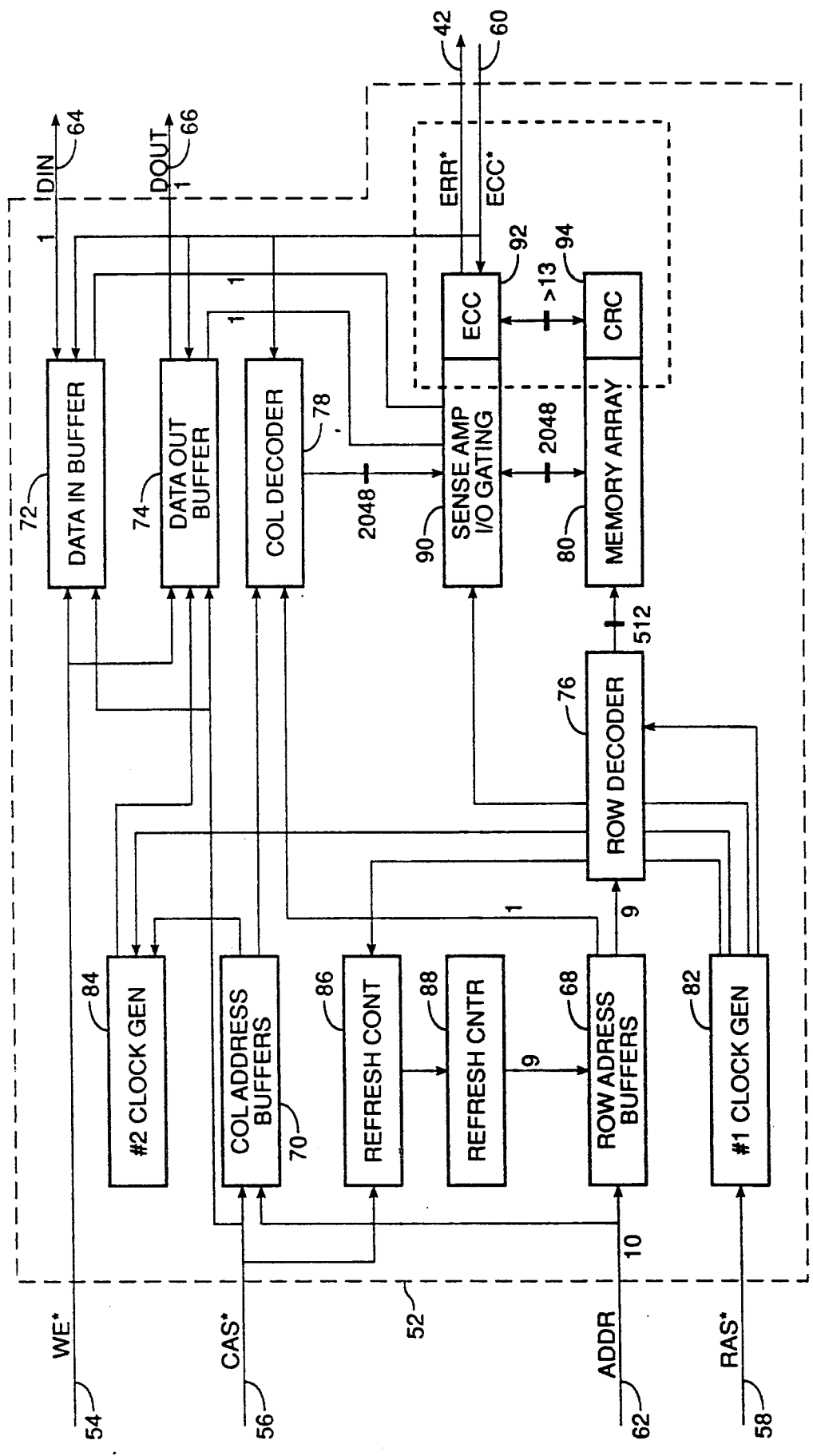
FIG. 4: is a block diagram depicting components of a DRAM usable in connection with the present invention.

As seen in FIG. 4, a DRAM chip 52, usable in the DRAM memory array 50, receives control signals via a write-enable (WE) line 54, a column address strobe (CAS) line 56, a row address strobe (RAS) line 58, and an error correction code (ECC) line 60 from the memory controller 22. The chip 52 receives an address over an address line 62 from the memory controller 22. The length of the multiplexed address will vary, depending upon the particular implementation. In the embodiment depicted in FIG. 4, the address is 10-bits wide. The DRAM depicted in FIG. 4 is x1 memory. In x1 memory, an N bit word is stored in N DRAM chips, each DRAM chip storing one bit of that word, with the hard error signal for the word being the result of OR-ing the hard error signals from each DRAM in the array. In such a scheme, for example, 32 DRAMS, each storing $2^{20}$ bits, would be used to store $2^{20}$ words, each word having 32 bits. In $\times 1$ memory, data-in and data-out lines 64, 66 are also one-bit wide. The present invention is equally applicable to other memory implementations, including $\times 4$, $\times 8$, $\times 16$ or larger implementations, wherein each chip will be used to store four bit, eight bit, sixteen bit or larger portions of the words stored in the memory array 50. In such cases, the data-in 64 and data-out 66 lines will be four, eight, sixteen or more bits wide. The memory chip 52 is configured to output a hard error signal over a signal line 42.

The chip 52 includes row address and column address buffers 68, 70 for holding addresses received from the address line 62, and data-in and data-out buffers 72, 74 for holding data received from or to be transmitted on the data-in and data-out lines 64, 66. The row address and column address in the buffers 68, 70 are coupled to row decoder and column decoders 76, 78, respectively, for translating the row and column addresses into signals usable for selecting to the memory array 80. Timing of operation is controlled by clock signals provided by first and second clock signal generators 82, 84. Memory refresh is controlled by refresh controller circuitry 86 and a refresh counter 88. Data read from or written to the memory array 80 is amplified and latched by sense amplifier and I/0 gating circuitry 90. The sense amplifier 90 is coupled to error correction code (ECC) circuitry 92. The ECC circuitry is also coupled to the portion of the memory 80 which is used for storing error correction (CRC) bits 94.

Because the ECC circuitry 92 is on the same chip with the memory array 80 and sense amplifier 90, data read from or to be written to the memory array 80 can be provided to the ECC without sending the data over an external bus, such as a data bus. Instead, a plurality of direct dedicated signal lines are provided on-chip for conveying data to the ECC circuitry 92. Since data transmission is not limited to the bandwidth of an external bus, the ECC circuitry 92 can perform error detection/correction on a number of bits which is greater than the buswidth of the external buses, such as the data bus.

FIG. 4 depicts one example of providing the ECC 92 with a greater number of bits than the external bus buswidth. In the system depicted in FIGS. 3 and 4, the external buses, for example the system bus 12, or signal line 34 have a buswidth equal to the width of one word, for example 64 bits. The memory array 80, however, is configured to permit ECC access to an entire row of the memory 80. In the embodiment depicted in FIG. 4, a row of the memory 80 contains 2048 bits. When a row is accessed, as described more fully below, all 2048 bits in a row of memory 80 are provided to the sense amplifier 90. Using on-chip signal lines, all 2048 bits in the sense amplifier are provided to the ECC circuitry 92. The ECC circuitry 92 is connected by on-chip lines to the CRC portion of memory 94. Thus, in the configuration depicted in FIG. 4, the number of bits subjected to error detection/correction during a single ECC cycle (i.e., during a single assertion of the ECC control signal 60) is 2048. For the example shown in FIG. 4, this means that error correction/detection is conducted on one entire row of memory 80 during a single ECC cycle.

In the embodiment depicted in FIG. 4, 13 CRC bits are used in connection with correcting 2048 data bits. Using well-known error correction algorithms, this permits detection of up to two errors and correction of one error among the 2048 bits. On-chip ECC is compatible with other numbers of data bits and correction bits per ECC cycle. By decreasing the number of data bits and/or increasing the number of CRC bits per cycle, a larger number of errors can be detected and corrected per ECC cycle.

The present invention takes full advantage of the types of memory which are configured for permitting rapid access to a page or row of memory. Examples of such memory types are static column mode memories or fast-page mode memories. Although these memories are configured to allow selection of a page or row of memory by providing a row address, previous error correction devices have not taken advantage of this availability of a row of memory. Thus, according to previous devices, although memory can be selected row-wise, error correction was not performed on all of a selected row. Typically, error correction was performed on a number of bits equal to the word length or to the width of an external bus, such as the data bus 12a. The present invention preferably performs error correction on the entire portion of memory which can be selected by a row address. Thus, according to the present invention, a column address need not be specified when conducting an error correction cycle.

Figure 5:
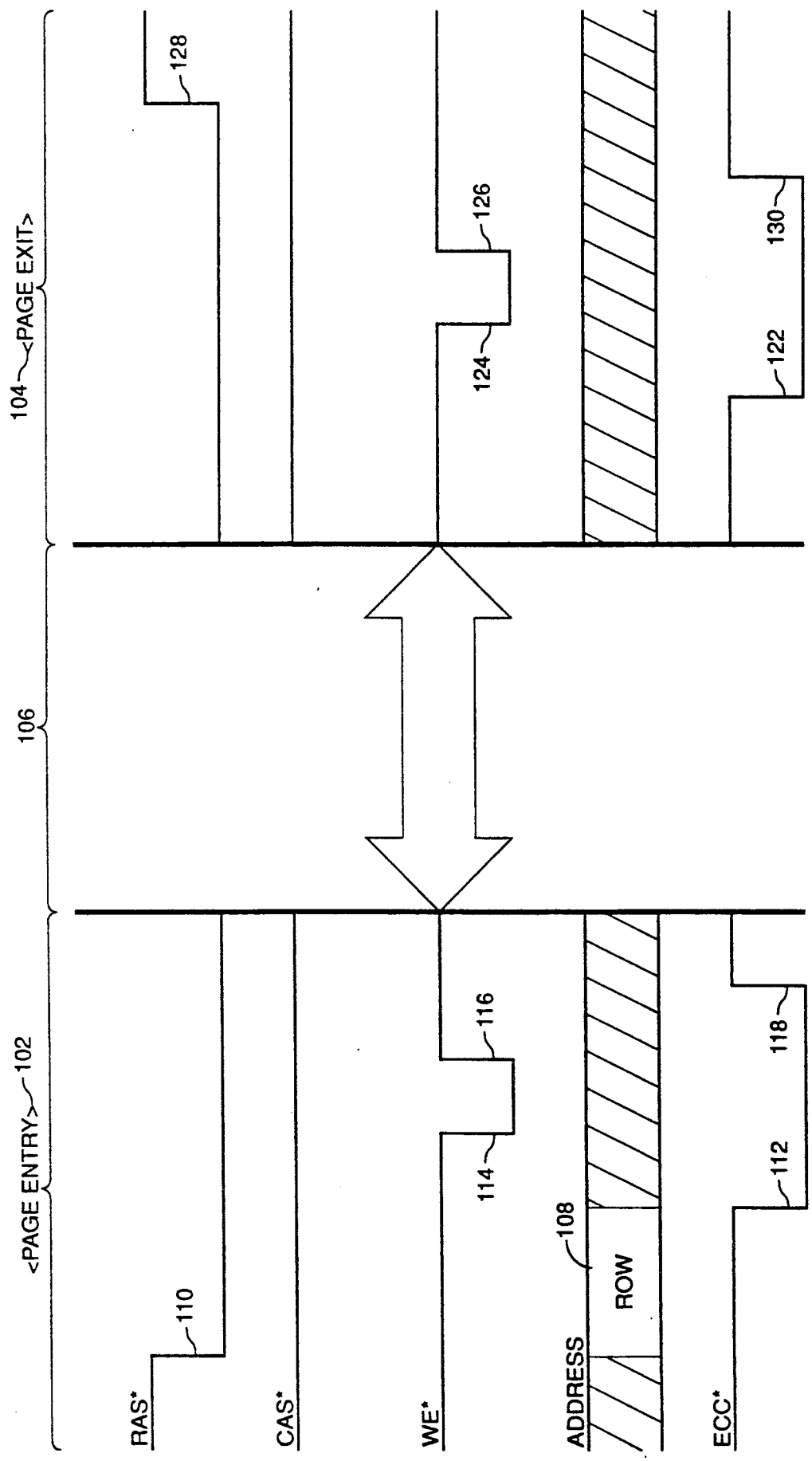
FIG. 5 is a timing diagram of the state of various signals used according to an embodiment of the present invention.

FIG. 5 depicts the timing of various signals used during operation of the error correction circuitry of the present invention. The timing diagram of FIG. 5 is applicable to a write cycle, a read cycle, or a refresh/scrub cycle. FIG. 5 includes the page entry portion 102 of the memory access cycle and the page exit portion 104. Between the page entry portion 102 and page exit portion 104 is an access portion 106, during which reading from or writing to the memory, or refreshing the memory can occur in the normal fashion. During the access portion data within a row can be accessed independently of the EC circuitry and, thus, without EC overhead.

The page entry portion 102 is initiated with placing a row address 108 on the address bus 62. While the row address 108 is on the address bus 62, the RAS signal is asserted 110. Assertion of the RAS signal 110 results in initiation of the first clock signal 82, and causes the row decoder 76 to provide a signal for accessing one row of the 512 rows of memory 80. Following assertion of the RAS signal 110, the ECC enable signal is asserted 112. Subsequent assertion of the write enable signal 114 while ECC is asserted causes the row which has been addressed and sensed by the sense amplifier 90 to be latched in the ECC 92. The ECC 92, using well-known circuitry and algorithms, detects the presence of any errors in the 2048 data bits in the addressed row. If the ECC is able to correct the errors, i.e., if there are no more than a predetermined number of errors, the ECC circuitry provides corrected data on the lines connecting the ECC to the sense amplifier 90. When the write enable signal is deasserted 116 while ECC is asserted, the row which has been corrected by the ECC is latched in the sense amplifier 90. If more errors were detected than are correctable by ECC, ECC provides a signal indicating this state on signal line 42. Deassertion of the ECC enable signal 118, during a time when RAS is asserted, initiates the access portion of the memory cycle 106, during which reading, writing, and refreshing of memory is conducted. Any type of standard DRAM read/write refresh signal can be used, such as those depicted in "MOS Memory Products Data Book," of Toshiba America, Inc., March 1988.

After the access portion of the memory cycle 106, the page exit portion 104 is begun. The page exit portion 104 begins with assertion of the ECC enable mode 122. Subsequent assertion of the write enable signal 124, during a time when the ECC signal is asserted, results in the row currently stored in the sense amplifier being latched in the ECC circuitry 92. As before, the ECC circuitry 92 detects and corrects errors in the 2048 bits of the row. The ECC generates the proper CRC bits, corresponding to any data which was written to memory during the access portion 106. Upon deassertion of the write enable signal 126, the corrected row is provided to the sense amplifier 90 and, if the number of errors exceeds the errors which are correctable by the ECC, a signal indicating this state is provided on signal line 42.

Following deassertion of the RAS signal 128 and ECC enable signal 130, the corrected data in the sense amplifier 90 is read back into the memory array 80 and the proper 13-bit CRC code is read into the CRC portion of memory 94, including generated bits corresponding to any data which has been written to the memory.

In an alternative embodiment, the ECC portions of the cycle, i.e., the page-entry portion 102 and/or pageexit portion 104, can be deleted during certain types of memory access. For example, during a memory access in which only read operations have taken place (for example, during a cache line-fill operation), error correction during the page exit portion 104 of the cycle could be deleted, since no new data has been written to the memory.

Figure 6:
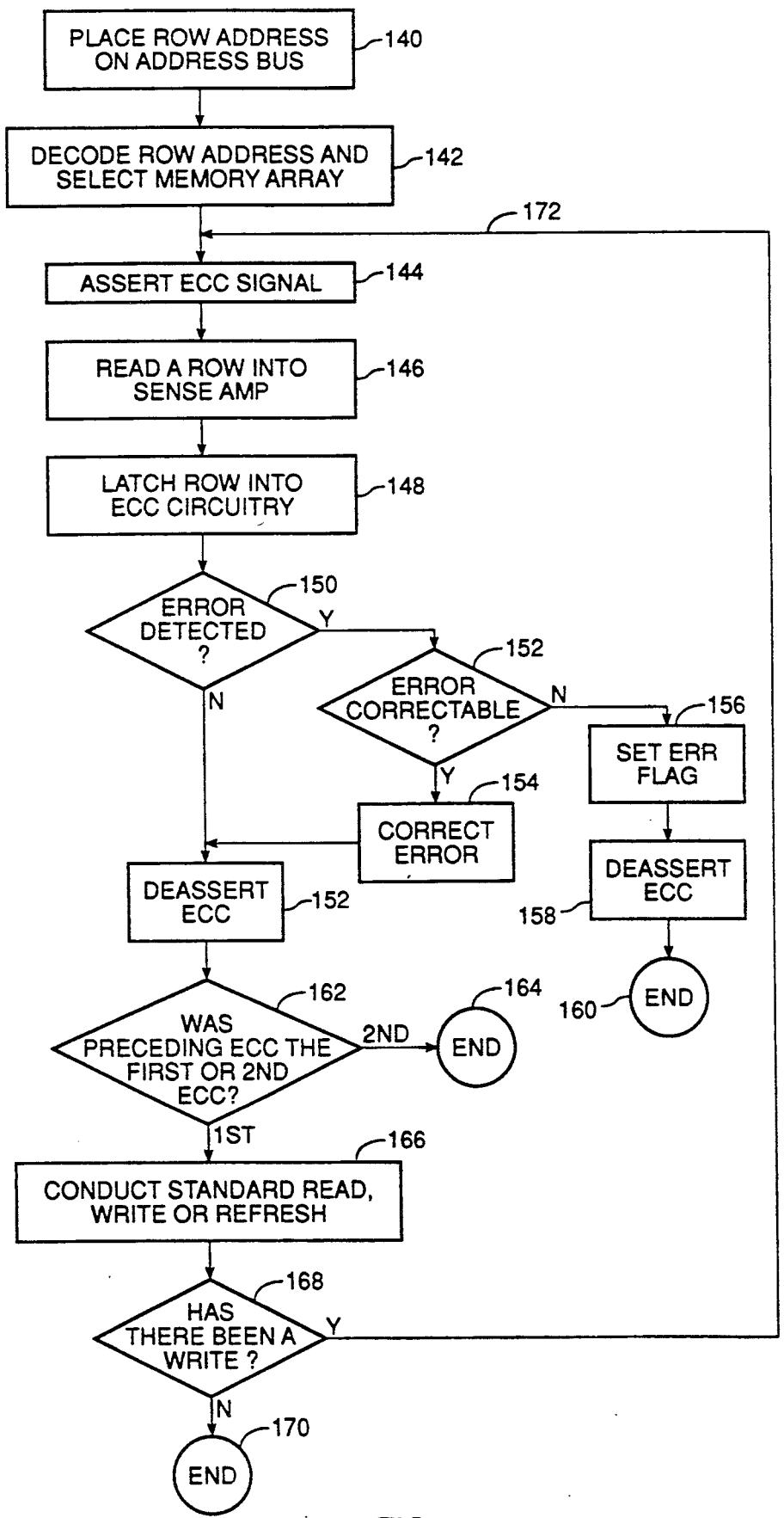
FIG. 6 is a flow chart of an error correction method according to the present invention.

FIG. 6 is a flow chart depicting a method of error correction according to the present invention. According to the method, a row address is first placed on the address bus 140. The row address is decoded, and the decoded address is sent to the memory array to permit access of the addressed row. The ECC enable signal is asserted 144, and a row is provided from the memory 80 to the sense amplifier 90, 146. The row is latched into the ECC 148, which determines whether an error has been detected 150. If no error is detected, the ECC may be deasserted 152. If an error has been detected, the ECC determines whether the error is correctable 152, and provides corrected data 154 when possible. If the error is not correctable, an error flag is provided 156 on signal line 42. When there is an unrecoverable error, it is preferred to end the memory cycle and, accordingly, the ECC enable signal is deasserted 158 and the memory cycle ends 160.

If there have been no errors, or the errors have been corrected, following deassertion of the ECC 152, it is determined whether the ECC cycle 148-154 was the first ECC (i.e., page entry portion 102) or the second ECC (i.e., page exit portion 104) cycle 162. If the preceding ECC cycle was during a page exit portion 104, the memory access cycle is ended 162. If the preceding ECC was a page entry portion, the ECC cycle is followed by a standard read, write, or refresh cycle 166. Following the standard read, write, or refresh cycle 166, it is determined whether there has been a write operation during the read, write, or refresh cycle 168. If there has been no write, the memory access cycle can be ended 170, since there is no need for an additional ECC cycle. If there has been a write cycle, an additional ECC cycle is undertaken 172.

In light of the above description, a number of advantages of the present invention are apparent. The overhead associated with error correction is reduced because the number of bits corrected in each ECC cycle is not limited by the buswidth of an external bus. Because error correction can be conducted with little overhead, higher-order error correction can be conducted, such as enabling detection of three errors and correction of two errors per ECC cycle. The ability to efficiently correct errors, particularly multiple errors, makes it feasible to produce memory chips which have one or more known hard errors. For this reason, the present invention permits the increase of effective yields for producing memory chips, because memory chips with known hard errors can be sold if it is known that such errors can be corrected efficiently. The present invention provides for performing error correction in connection with the most error-prone portion of the memory cycle, i.e., during RAS assertion. Preferably, ECC is not conducted during the relatively less error-prone portion of the cycle when CAS is asserted. The present invention takes advantage of memories such as static column mode memories or fast-page mode memories which are configured to permit access to an entire row of memory during a single memory cycle.

Although the DRAM chip is made more complex by inclusion of ECC circuitry, the memory controller is made correspondingly simpler because of the lessened burden of ECC control. The described on-chip ECC can be configured in a DRAM which is compatible in the sense that the new DRAM chip can be substituted, without modification, for a conventional DRAM chip by merely making no use of the provided ECC on-chip circuitry. Similarly, memory subsystems which are intended to accommodate the DRAM chip of the present invention can also accommodate conventional DRAM chips, although there will be no error correction in such a case. Providing the ECC circuitry on-chip results in a more compact memory configuration, which will require less power than configurations having an external ECC chip.

A number of variations and modifications of the described invention can also be used. The memory controller can be provided as a separate chip or can be provided on-chip with the memory and ECC circuitry. In certain circumstances, it may be possible to delete the page entry portion 102 or page exit portion 104. For example, error correction could be conducted only during refresh/scrub cycles. On-chip ECC can be used in connection with memories which access other than by row and column, or which access more or less than one row of memory per cycle. The ECC circuitry can be configured to conduct detection/correction on less than one row during each ECC cycle, such as a ¼ row for a ×4 DRAM organization. ECC circuitry, according to the present invention, can be provided to attempt correction during each ECC cycle, or can be configured to attempt data correction only if an error has been detected or only if the detected errors are correctable. The ECC circuitry of the present invention can be configured to conduct both error detection and error correction on-chip, or can be configured to conduct error detection on-chip and error correction, if necessary, off-chip.

Although the description relates to a memory in which each row (or "page") has ECC bits appended for error checking and correction of the row, each row could also be broken into sections. For example, each row could be broken into four, eight, sixteen or another number of sections, each with its independent ECC circuit. The hard error indicator from each would be combined in an OR fashion to form the hard error status line. It is expected that such a configuration would be most useful in larger memories.

Although the present invention has been described by way of a preferred embodiment and various modifications and variations, other modifications and variations can also be practiced, as will be apparent to those skilled in the art, the invention being defined by the following claims.

What is claimed is:

1. Apparatus usable for detection of errors in a memory system of a computer, the computer including a central processing unit and a data bus connecting the central processing unit to the memory system, the data bus having a width equal to a first number of bits, the apparatus comprising:
   a random access memory device in the memory system, the memory device for storing one or more rows of bits; and
   error detection means for receiving a second number of data bits and third number of error correction bits from said memory device where the second and the third number of bits are from accessing an entire row from one of the rows of bits from the memory device and providing a first signal when an error is detected in said second number of bits where the second number of bits is detected in one detection cycle, said second number of bits being greater than said first number of bits, such that the number of data bits on which error detection is performed is greater than the width of said data bus.

2. Apparatus, as claimed in claim 1, wherein said first means includes means for correcting at least a first erroneous bit among said second number of bits.

3. Apparatus, as claimed in claim 1, wherein said memory device is a static column mode memory device.

4. Apparatus, as claimed in claim 1, wherein said memory device is a fast page mode memory device.

5. Apparatus, as claimed in claim 1, wherein said second number is at least 512.

6. Apparatus, as claimed in claim 1, wherein said second number is at least 2048.

7. Apparatus, as claimed in claim 1, wherein said third number is at least 13.

8. Apparatus usable for detection of errors in a memory system of a computer, the apparatus comprising:
   a row and column organized dynamic random access memory device for storing bits, said memory device formed on a single integrated circuit chip, said memory device including means for accessing the contents of an entire row of bits from said memory; and
   error correction circuitry for receiving data from the entire row of bits from said memory array and for detecting at least a first of any error in said received bits in one detection cycle, said circuitry being substantially all formed on said chip.

9. Apparatus, as claimed in claim 8, further comprising error correction circuitry for correcting at least a first erroneous bit, said correction circuitry being formed on said chip.

10. Apparatus usable for detection of errors in a memory system of a computer, the apparatus comprising:
    a dynamic random access memory array for storing bits at memory locations addressable by a row address and a column address, wherein a first number of bits is accessible by changing said column address while said row address remains constant, the first number of bits is equal to the number of bits in all memory locations addressed by all column addresses and by a single row address; and
    error detection means for receiving a first group of data bits, the number of bits in said first group being equal to said first number of bits, detecting at least a first of any error in said first group where the whole first group is detected in one detection cycle and providing a signal when an error is detected, such that a single error detection operation is performed on an entire row of said memory.

11. Apparatus, as claimed in claim 10, wherein said memory array and said error detection means are formed on a single integrated circuit chip.

12. A method for detecting and correcting errors in a memory system of a computer, the computer including a memory array for storing bits at memory locations addressable by a row address and a column address, a first number of bits being accessible by changing said column address while said row address remains constant to access an entire row of bits, and an error detection device for receiving the first number of bits and detecting errors in the received bits, the method comprising:
    asserting a first row address;
    asserting a row address strobe while said first row address is asserted;
    receiving at least said first number of bits in said error detection device, wherein said received bits are all received substantially simultaneously; and
    providing a first signal when at least a first error is detected by said error detection device in said first number of bits when the first number of bits is detected in one detection cycle.

13. A method, as claimed in claim 12, further comprising refreshing a row of said memory addressed by said first row address following said step of receiving.

14. A method, as claimed in claim 12, further comprising:
asserting a first column address and a column address strobe; and
reading data from at least a memory location addressed by said first row address and said first column address.

15. A method, as claimed in claim 12, further comprising:
asserting a first column address and a column address strobe; and
writing data to memory at a memory location addressed by said first row address and said first column address.

16. A method, as claimed in claim 12, further comprising correcting at least a first erroneous bit in said received bits and writing at least said corrected bit to said memory.

17. A method, as claimed in claim 12, further comprising:
asserting at least a first column address;
receiving at least a second set of said first number of bits in said error detection device; and
providing a signal when an error is detected in at least a first bit among said second set of received bits when the second set of received bits is detected in one detection cycle, following said step of asserting at least a first column address.

18. A method of scrubbing at least a portion of a refreshable, row-accessible memory system to correct accumulated soft errors, the method comprising:
providing row addresses for each row of bits in said portion of memory;
accessing a row of memory by asserting a row address strobe following said providing of each said row address;
performing error correction on the row of memory addressed by said row address in one correction cycle after accessing of a row;
refreshing said row of memory addressed by said row address after accessing of a row, without reaccessing said row between said error correction performance and said refreshing of said row of memory.

19. A computer with apparatus usable for the detection of errors in the memory of the computer, the computer comprising:
a central processing unit;
a system bus having a data bus with a first number of bits, the system bus being connected to the central processing unit;
a memory controller having address information and control signals connected to the system bus;
a memory connected to the memory controller and receiving address information and control signals from the memory controller, the memory having one or more rows of bits, each row of the memory storing a second number of data bits and for storing a third number of error correction bits for the second number of data bits such that the second number of data bits is larger than the first number of bits;
an error correction code checking and generating circuit connected to the system bus and to the memory, the circuit serving as means for receiving a second number of data bits and a third number of error correction bits from one row of the memory where the second and the third number of bits are accessed in one accessing cycle, for detecting at least a first of any error on the received second number of data bits using the third number of error correction bits in one detection cycle, and for providing an error signal when at least a first error is detected by the circuit.

* * * * *